(12) United States Patent
Boldi et al.

(10) Patent No.: US 10,014,910 B2
(45) Date of Patent: Jul. 3, 2018

(54) METHOD FOR DISTRIBUTED MOBILE COMMUNICATIONS, CORRESPONDING SYSTEM AND COMPUTER PROGRAM PRODUCT

(75) Inventors: Mauro Boldi, Turin (IT); Paolo Gianola, Turin (IT); Bruno Melis, Turin (IT); Alfredo Ruscitto, Turin (IT)

(73) Assignee: TELECOM ITALIA S.P.A., Milan (IT)

( * ) Notice: Subject to any disclaimer, the term of this patent is extended or adjusted under 35 U.S.C. 154(b) by 12 days.

(21) Appl. No.: 13/142,443

(22) PCT Filed: Dec. 30, 2008

(86) PCT No.: PCT/EP2008/011138
§ 371 (c)(1),
(2), (4) Date: Jun. 28, 2011

(87) PCT Pub. No.: WO2010/075864
PCT Pub. Date: Jul. 8, 2010

(65) Prior Publication Data
US 2011/0268033 A1    Nov. 3, 2011

(51) Int. Cl.
*H04W 4/00*    (2018.01)
*H04B 7/022*    (2017.01)
(Continued)

(52) U.S. Cl.
CPC ........... *H04B 7/022* (2013.01); *H04B 7/0617* (2013.01); *H04W 4/18* (2013.01); *H04W 88/08* (2013.01); *H04W 92/10* (2013.01)

(58) Field of Classification Search
CPC ..... H04W 16/28; H04W 88/085; H04W 4/18; H04W 92/10; H04W 88/08; H04W 92/12;
(Continued)

(56) References Cited

U.S. PATENT DOCUMENTS 7,747,285 B2 * 6/2010 Lozano ....................... 455/562.1
7,760,699 B1 * 7/2010 Malik ........................... 370/342
(Continued)

FOREIGN PATENT DOCUMENTS

EP    1 530 316 A1    5/2005
EP    1 777 837 A1    4/2007
(Continued)

OTHER PUBLICATIONS

International Search Report from European Patent Office for International Application No. PCT/EP2008/011138, dated Oct. 15, 2009.
(Continued)

*Primary Examiner* — Harun Chowdhury
(74) *Attorney, Agent, or Firm* — Finnegan, Henderson, Farabow, Garrett & Dunner, L.L.P.

(57) ABSTRACT

A method of arranging exchange of signals between user terminals in a cellular communication system and at least one base station. The base station includes a central unit and a plurality of remote units. The signals are exchanged between the central unit and the remote units as aggregated signals for plural user terminals. The signals are processed at the remote units as distinct signals each associated with a respective one of the plural user terminals.

9 Claims, 11 Drawing Sheets

(51) Int. Cl.
*H04B 7/06* (2006.01)
*H04W 4/18* (2009.01)
*H04W 88/08* (2009.01)
*H04W 92/10* (2009.01)

(58) Field of Classification Search
CPC .... H04B 7/0617; H04B 7/0408; H04B 7/022; H04B 7/04; H01Q 1/246
USPC ....... 370/310, 320, 334, 335, 342, 343, 344, 370/252, 328, 210; 455/562.1, 561; 375/267
See application file for complete search history.

(56) References Cited

U.S. PATENT DOCUMENTS

| | | | |
|---|---|---|---|
| 7,809,073 B2* | 10/2010 | Liu | 375/267 |
| 8,041,395 B2* | 10/2011 | Lo et al. | 455/562.1 |
| 2002/0193146 A1 | 12/2002 | Wallace et al. | |
| 2005/0141545 A1 | 6/2005 | Fein et al. | |
| 2006/0217158 A1* | 9/2006 | Uwano et al. | 455/562.1 |
| 2007/0072646 A1* | 3/2007 | Kuwahara et al. | 455/561 |
| 2007/0093273 A1* | 4/2007 | Cai | 455/562.1 |
| 2007/0207838 A1* | 9/2007 | Kuwahara et al. | 455/562.1 |
| 2007/0230328 A1* | 10/2007 | Saitou | H04W 92/12 370/210 |
| 2008/0003948 A1 | 1/2008 | Mitran | |
| 2008/0070502 A1 | 3/2008 | George et al. | |
| 2008/0150514 A1 | 6/2008 | Codreanu et al. | |
| 2009/0238566 A1 | 9/2009 | Boldi et al. | |
| 2010/0080555 A1 | 4/2010 | Xu et al. | |
| 2011/0086654 A1 | 4/2011 | Larsson | |
| 2011/0255434 A1* | 10/2011 | Ylitalo | 370/252 |

FOREIGN PATENT DOCUMENTS

| | | |
|---|---|---|
| EP | 1887723 * | 2/2008 |
| WO | WO 2004-047472 A1 | 6/2004 |
| WO | WO 2006/102919 A1 | 10/2006 |
| WO | WO 2007/059496 A2 | 5/2007 |
| WO | WO 2008-003022 A2 | 1/2008 |

OTHER PUBLICATIONS

Karakayali, M. K. et al., "Network Coordination for Spectrally Efficient Communications in Cellular Systems," IEEE Wireless Communications, pp. 56-61, (2006).

* cited by examiner

METHOD FOR DISTRIBUTED MOBILE COMMUNICATIONS, CORRESPONDING SYSTEM AND COMPUTER PROGRAM PRODUCT

CROSS REFERENCE TO RELATED APPLICATION

This application is a national phase application based on PCT/EP2008/011138, filed Dec. 30, 2008, the content of which is incorporated herein by reference.

FIELD OF THE INVENTION

This disclosure relates to techniques for providing radio access in mobile communication.

More specifically, this disclosure has been developed with attention paid to its possible use in networks employing distributed antenna systems (DAS).

DESCRIPTION OF THE RELATED ART

A DAS system includes one or more Central Units (CU) connected preferably by means of a fiber link to a plurality of Remote Units (RU). The or each central unit is connected to the network of the telecommunication operator.

FIG. 1 shows a conventional DAS architecture where a central unit CU receives data via an interface IF. The central unit CU performs the signal processing operations of a base station (BS) equipment. It includes a block 10 to implement the higher layer protocols (L2/L3), such as Radio Resource Control (RRC), Radio Link Control (RLC) and Medium Access Control (MAC), and a block 12 to perform the physical layer (L1) signal processing operations up to the generation of a composite digital baseband signal CDS.

The composite digital baseband signal is then converted from electrical to optical (E/O) by means of a block 14 and transmitted over a fiber link 16 to the remote units RU.

Each remote unit RU receives the composite baseband signal CDS that is first converted from optical to electrical (O/E) by means of a block 18.

The signal is then filtered by a front-end block 20, converted from digital to analog (D/A) at a block 22, up-converted from baseband to radiofrequency (RF) and amplified by a power amplifier at a block 24, and radiated by antennas TX.

FIG. 1 shows a remote unit RU equipped with $K_m$ antennas TX (where $K_m>1$). Such a remote unit RU permits to implement a Reconfigurable Antenna system where the radiation diagram of the RU antenna array is remotely controlled on cell basis by means of Operation and Maintenance (O&M) commands. For example, the radiation diagram of the antenna array of the remote units RU may be modified by means of a block 26, which implements a cell weighting operation where a set of $K_m$ complex beamforming weights is applied at the digital level on the composite baseband signals CDS to be radiated from the antennas TX. The beamforming weights are computed by a Network Manager System and provided to the remote units RU in the form of semi-static configuration parameters. These beamforming weights can be adapted on a long term basis according to traffic variations or to changes in the network configuration. A description of such reconfigurable DAS architecture is described in the document WO 2006/102919.

The previous signal processing steps refer to downlink transmission. In uplink transmission the inverse operations may be performed both in the remote units RU and the central unit CU, and the signal transmitted over the optical fiber is still a composite digital baseband signal CDS formed by the sum of the different user signals.

Specifically, FIG. 2 shows a DAS receive architecture comprising a central unit CU and remote units RU.

In the exemplary DAS architecture illustrated, each remote unit RU receives data at $K_m$ antennas RX. The received data are then down-converted from radiofrequency to baseband at blocks 44, and converted from analog to digital (A/D) at blocks 42 before the signals may be filtered by front-ends 40.

Again, the radiation diagram of the RU antenna array may be modified by means of a block 46 which implements a cell weighting operation. The weighted composite digital baseband signals CDS are then converted from electrical to optical by means of a block 38, before the signals are transmitted over a fiber link 36 to the central unit CU.

The weighted composite baseband signals are converted back from optical to electrical at a block 34, before the signals are processed by a block 32, which performs the physical layer (L1) signal processing operations, and a block 30, which implements the higher layer protocols (L2/L3). The received data are then available via an interface IF.

The composite digital baseband signals CDS comprised of the sum of the various user signals, are transmitted over the fiber links 16 and 36 by using standard transmission formats defined by international consortia such as Common Public Radio Interface (CPRI) or Open Base Station Architecture Initiative (OBSAI).

In case of a radio access technology based on Code Division Multiple Access (CDMA), the composite signal transmitted over the fiber link is a chip level signal formed by the sum of the various user signals. The different user signals are separated in the code domain by allocating to each user a different spreading sequence.

Examples of radio access technologies using CDMA are the Universal Mobile Telecommunications System (UMTS) and the correspondent evolution denoted as High Speed Packet Access (HSPA). For example, the downlink signal of one UMTS/HSPA carrier, transmitted from the central unit CU to the remote units RU over the fiber link 16, is a complex baseband chip level signal sampled at $f_s^{(DL)}=3.84$ MHz and quantized over a suitable number of bits (e.g. $N_b=20$ bits). This composite signal is formed by the sum of the dedicated and common physical channels each spread with a different code sequence.

In case of a radio access technology based on Orthogonal Frequency Division Multiple Access (OFDMA), the time domain signal is sent over the fiber link 16 after the Inverse Fast Fourier Transform (IFFT) operation at the transmitter. Also in this case, the various user signals are superimposed in the time domain. Examples of radio access technologies that use the OFDMA technique are the Worldwide Interoperability for Microwave Access (WiMAX) system and the evolution of the UMTS system denoted as Evolved UTRAN (E-UTRAN) or Long Term Evolution (LTE). In case of the LTE system with 20 MHz channel bandwidth the downlink signal of one LTE carrier, transmitted from the central unit CU to the remote units RU, is a complex baseband signal taken after the IFFT operation with sampling frequency of 8×3.84 MHz=30.72 MHz and quantized over a suitable number of bits.

Both DAS architectures shown in FIGS. 1 and 2 rely on signal processing algorithms operating on each user signal separately.

One example of such algorithms is adaptive beamforming. Adaptive beamforming involves multiplications of the user signals at the different antenna branches with complex weighting factors before the signals are transmitted, or before the signals received from the different antennas are summed in case of the uplink. However, these weighting factors are different for each user and may be updated continuously in order to track the movement of the user within the cell and to track possible channel variations.

Another example of algorithms, that operate on a per-user basis, are the so-called "network coordination" algorithms. A description of possible network coordination algorithms that operate at the physical layer level is provided e.g. in the article of G. J. Foschini, "Network Coordination for spectrally efficient communications in cellular systems". IEEE Wireless Communications, August 2006. When network coordination is employed, the antennas of different base stations (BS) act together as a single network antenna array, and each mobile may receive useful signals from nearby BSs. The concept of network coordination could be applied also in the case of a DAS system among different remote units.

OBJECT AND SUMMARY OF THE INVENTION

The inventors have noted that the application of the above mentioned algorithms requires that all the signal processing operations are performed in the central unit CU, where the signals of the different users are still available separately. This architecture lacks flexibility, because any change in the algorithms used may involve a software and/or hardware modification in the central unit CU. Besides, the scalability in terms of maximum number of remote units connected to a given central unit may be limited.

Another drawback is represented by the transmission data rate over the fiber links 16 and 36 in FIGS. 1 and 2 required in order to transmit one composite digital baseband signal CDS for each transmit antenna TX of each remote unit RU or for each receive antenna RX of each remote unit RU when considering the uplink. As the number of remote units RU connected to a given central unit CU increases, the available transmission capacity on the fiber links 16 and 36 becomes rapidly a bottleneck.

The need is therefore felt for an architecture that enables signal processing on a per-user basis also in the remote units for enabling an efficient application of these algorithms in a DAS system.

The object of the invention is thus to provide a satisfactory response to that need.

According to the present invention, that object is achieved by means of a method having the features set forth in the claims that follow. The invention also relates to a corresponding system, as well as a computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is intended to highlight the possibility for the present invention to be implemented in a distributed/modular fashion.

The claims are an integral part of the disclosure of the invention provided herein.

In an embodiment, the arrangement as described herein is an architecture of a distributed antenna system (DAS), which provides a high level of flexibility and scalability.

In an embodiment, the signal processing on a per-user basis within a given remote unit RU or in a cooperative form involving multiple remote units is enabled by defining a particular partitioning of the physical layer (L1) functionalities between the central unit CU and the remote units RU as will be apparent by the following description and the annexed claims.

Embodiments of the DAS architecture disclosed herein may also provide throughput reduction of the signals transmitted on the fiber with respect to the prior-art DAS architecture shown in FIGS. 1 and 2. A throughput reduction may be particularly important considering that broadband wireless communication systems, like for example LTE and WiMAX, are capable of providing aggregate throughput per cell in the order of hundred of Mbits per second. The more efficient utilization of the transmission resources between the central unit CU and the remote units RU may thus permit to increase the maximum number of remote units that may be connected e.g. to a given fiber ring. Such a throughput reduction may also permit to use central units and remote units belonging to different communication standards on the same fiber. For example, it may be possible to operate with a single fiber ring remote units, which support both a CDMA based communication system and an OFDM based communication system.

BRIEF DESCRIPTION OF THE ANNEXED VIEWS

The invention will now be described, by way of example only, with reference to the enclosed views, wherein:

FIGS. 1 and 2 have already been described in the foregoing;

DETAILED DESCRIPTION OF EMBODIMENTS

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

The following is a detailed description of possible embodiments of a cellular communication system wherein signals are "exchanged" (i.e. transmitted and/or received) between user terminals and at least one base station including a central unit and a plurality of remote units. As indicated, such a base station arrangement is currently referred to as a Distributed Antenna System or DAS.

More specifically, in the following exemplary architectures of DAS systems are described that enable the application of signal processing algorithms on user base in the remote units.

The proposed architectures are applicable to various radio networks such as networks being based on OFDMA and CDMA access techniques.

In an embodiment, an OFDM radio access technology, such as LTE or WiMAX, is used.

The baseband modem (BB modem) of an OFDMA based system is formed by a sequence of blocks that perform a series of operations, which are substantially similar for LTE and WiMAX systems.

Figure 3:
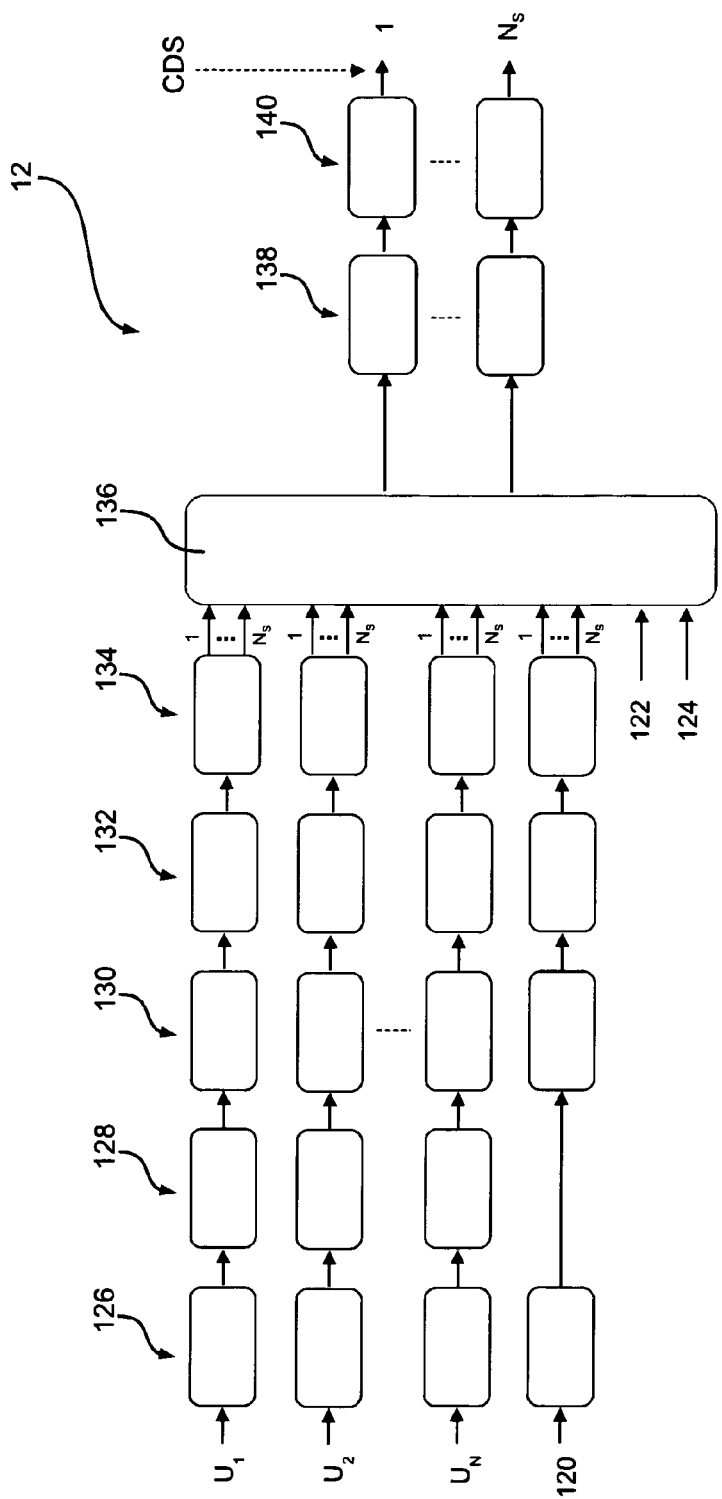
FIG. 3 is a block diagram of a typical downlink baseband modem supporting a radio access technology based on OFDM.

FIG. 3 shows an exemplary structure of a typical downlink baseband modem 12, which implements the physical layer (L1) processing in a wireless communication system based on the OFDMA radio access technique.

The baseband modem 12 receives at the input the transport blocks (T) from the Medium Access Control (MAC) layer for a set of different users and may provide at the output a composite digital baseband signal CDS formed by the sum of the different user data channels $U_1, U_2, \ldots U_N$, and e.g. control channels 120, a pilot channel 122 and a synchronization channel 124.

The user data channels $U_1, U_2, \ldots U_N$ and the control channels 120 are processed by channel coding blocks 126 that may perform operations such as Cyclic Redundancy Code (CRC) insertion, segmentation, channel coding and rate matching (i.e. puncturing/repetition).

The encoded bits of the user data channels $U_1, U_2, \ldots U_N$ are provided to the Hybrid Automatic Repeat-reQuest (H-ARQ) block 128 that manages the retransmission at physical layer level using techniques such as Chase Combining or Incremental Redundancy.

The user bit streams are then subject to interleaving at blocks 130, modulation at blocks 132 and possibly to Multiple Input Multiple Output (MIMO) processing at blocks 134.

In case of a multi-antenna transmission system that adopts MIMO techniques, the modulated symbols are elaborated by the processing blocks 134 that provide at the output $N_S \geq 1$ data streams. Such MIMO techniques may include spatial multiplexing, space-time coding, etc.

After MIMO processing, the complex symbols are mapped onto the OFDM subcarrier by a resource mapping block 136 and then converted from the frequency to the time domain by means of an IFFT operation at a block 138. After the IFFT operation, a Cyclic Prefix (CP) may be inserted at a block 140 e.g. in order to reduce intersymbol interference among consecutive OFDM symbols when the transmission occurs in a multipath channel.

FIG. 3 shows that the resource mapping block 136 receives at the input also the control channels 120 with signaling information for all the users in the cell. Such control channels 120 may carry critical information and thus are typically transmitted using robust channel coding schemes. H-ARQ procedures are not used for the control channels, while the other operations at blocks 130 to 134 are performed.

The resource mapping block 136 then performs a multiplexing of the data and control channels with layer 1 control information such as pilots 122, and synchronization channels 124.

The resource mapping block 136 performs the mapping of the different channels in the time-frequency (t-f) Resource Grid (RG) under the control of the scheduling function resident in the MAC layer. The resource grid may be considered as one matrix that contains the complete set of transmission resources available in the time and frequency domain. For example, each element of the RG matrix may represent one OFDMA subcarrier and the correspondent stored value may be one modulated symbol. In that case, the number of columns of the RG is equal to the number of OFDMA symbols in one frame period, while the number of rows of the RG is equal to the number of OFDMA subcarriers used for transmission.

For example, the number of subcarriers used for transmission may be equal to the IFFT size minus the null subcarriers located at the edge of the spectrum, which provide a spectrum guard versus the adjacent carriers. For example, in an embodiment of a LTE system with channel bandwidth of 10 MHz the IFFT size is equal to 1024 points and the number of used subcarriers is equal to 601 (including the DC subcarrier).

In an embodiment, the number of null subcarriers on the left and on the right of the spectrum is equal to 212 and 211 respectively.

In an embodiment, the number of OFDMA symbols in one frame of 10 ms is equal to 140, considering the case of normal cyclic prefix and frame Type 1. In this case the RG matrix would have 601 rows and 140 columns and each element of this matrix contains one modulated complex symbol of a certain physical channel. In case of a MIMO system with $N_S$ transmitted streams there will be one RG matrix for each stream.

In systems such as LTE and WiMAX, the OFDMA subcarriers are grouped in minimum transmission units that can be allocated by the scheduler to a specific user. The minimum transmission units have different sizes and denominations depending on the considered transmission system. For example in case of a LTE system, the elementary transmission unit is denoted as Resource Block (RB) and is formed by 12 adjacent subcarriers in the frequency domain and 6 or 7 OFDMA consecutive symbols in the time domain.

In case of the WiMAX system, the minimum transmission unit is denoted as slot and takes different sizes depending on the permutation scheme used for transmission. For example, in case of a distributed Partial Use of SubChannels (PUSC)

mapping in downlink the slot has an extension of 2 OFDMA symbols in the time domain and 14 adjacent subcarriers in the frequency domain.

The mapping of the symbols onto the transmission resources (i.e. the OFDM subcarriers) for the different data and control channels may be defined through a mathematic relationship, a formula or a dynamic look-up table that maps the modulated symbols to the inputs of the IFFT block.

In an embodiment, this mapping function is provided by the central unit CU to the remote units RU in the form of control information. This information may be refreshed on a frame by frame basis or with a refresh rate that corresponds to the scheduling period.

Figure 4:
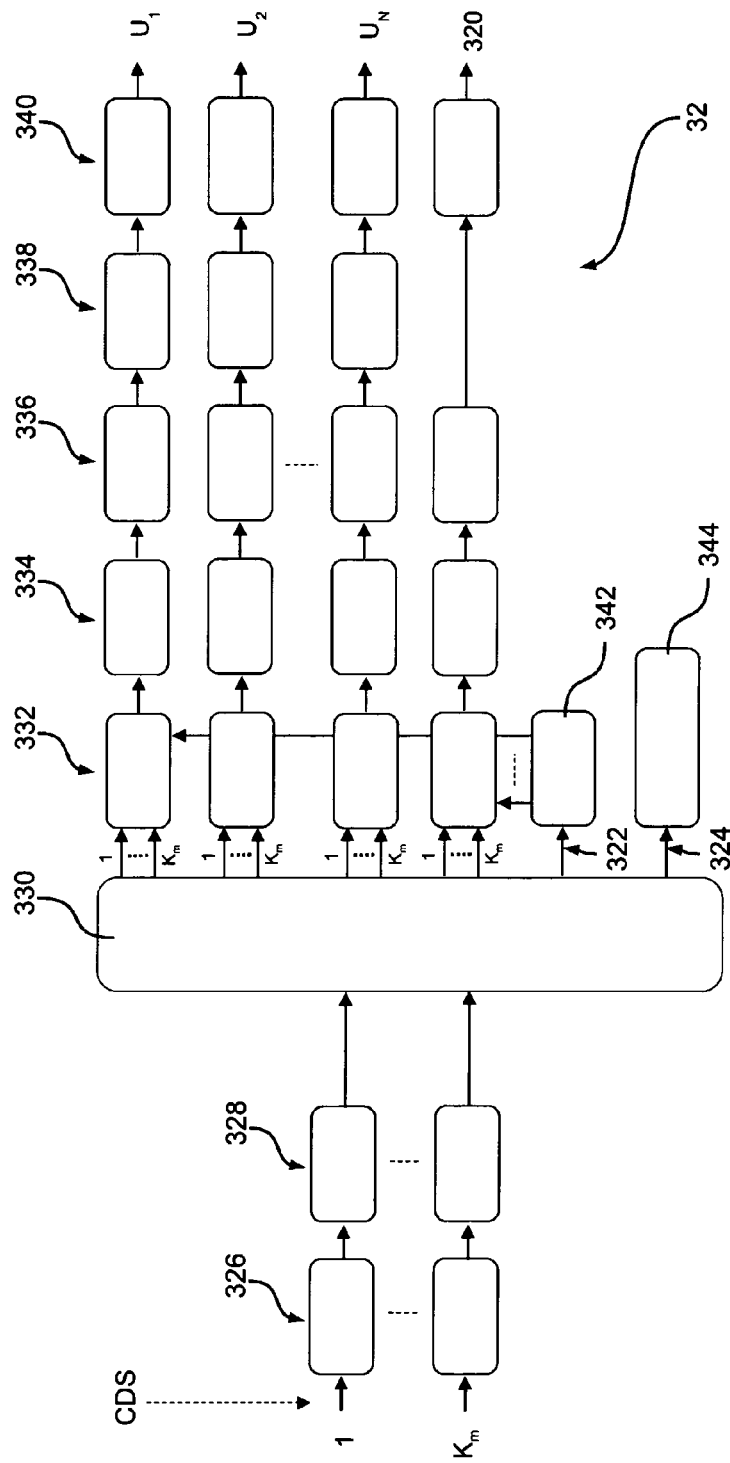
FIG. 4 is a block diagram of a typical uplink baseband modem supporting a radio access technology based on OFDM.

FIG. 4 shows the block diagram of a possible baseband modem 32 at the receiver side. As illustrated, the baseband modem 32 is composed by the cascade of the functional blocks that perform the inverse of the processing operations executed at the transmitter side.

The $K_m$ received signals at baseband level CDS are first subject to a CP removal operation at a block 326. The signals are then converted from the time domain to the frequency domain by means of an FFT operation at a block 328. A resource demapping block 330 may then demultiplexe the various data channels for the users $U_1$, $U_2$, ... $U_N$ and control channels 320, which may be processed independently.

In an embodiment, such processing involves a MIMO processing at blocks 332, demodulation at blocks 334, deinterleaving at blocks 336, H-ARQ processing at blocks 338 and channel decoding at blocks 340.

The main difference with respect to the transmitter portion is a channel estimation block 342 that extracts pilot symbols 322 to determine the frequency response (i.e. channel coefficients) in correspondence of the data subcarriers. Such channel estimation may be performed e.g. by means of interpolation techniques. The channel coefficient may then be used e.g. by blocks 332 in a manner known per se.

In an embodiment, such baseband modem at the receiver side 32 includes a synchronization unit 344 for synchronizing the operation of the complete system in accordance with a synchronization channel 324.

As mentioned in the foregoing, the arrangement described herein enables the signal processing on user base in the remote units RU by defining a particular partitioning of the baseband modem functionalities between the central unit CU and the remote units RU.

In a first embodiment, the signal transmitted on the fiber is the signal at the output of the resource mapping block 136 where the users are still separated in the frequency domain.

Figure 5:
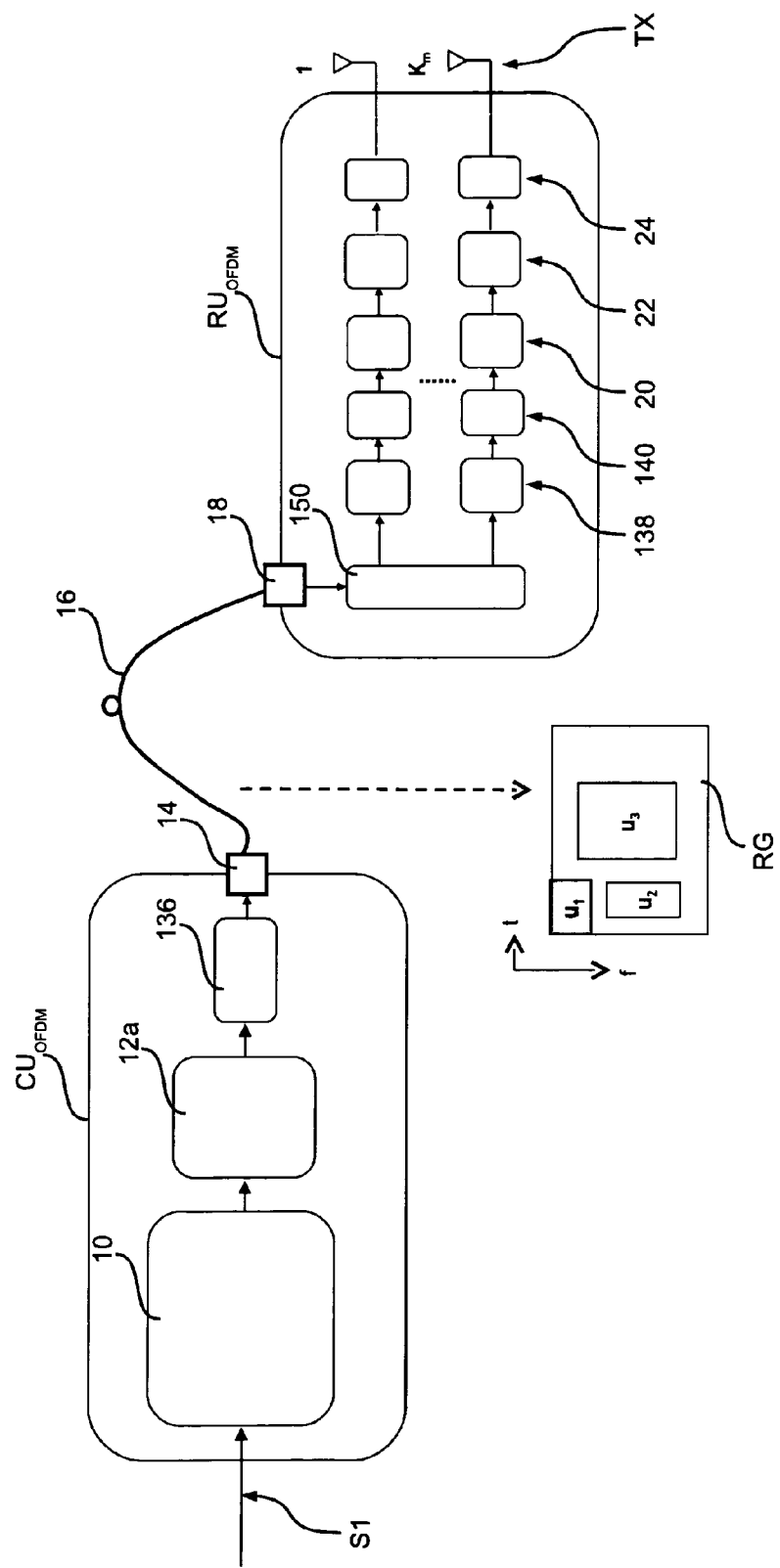
FIG. 5 is a block diagram of a first embodiment of the downlink portion of a DAS system supporting a radio access technology based on OFDM.

This first architecture is shown in FIG. 5 for the transmitter portion of an OFDM based DAS system, which receives data e.g. via a conventional S1 interface. Specifically, the baseband functionalities are split between a central unit $CU_{OFDM}$ and remote units $RU_{OFDM}$.

In this embodiment, the central unit $CU_{OFDM}$ still performs the operation of the resource mapping block 136, and all prior operations, such as channel coding, H-ARQ, interleaving, modulation and MIMO processing, at a block 12a (i.e. the operations of blocks 126 to 134 in FIG. 3).

In the exemplary embodiment illustrated, the $N_S$ resource grids RG at the output of the resource mapping block 136 are transmitted e.g. column by column over the fiber link 16. As mentioned in the foregoing, the data at the output of the resource mapping block 136 may be organized in $N_S$ resource grids RG, which are filled with the modulation symbols of the different data and control channels. For example, each column of the RG corresponds to one OFDMA symbol. The filling of the resource grid with the user data may be controlled e.g. by the scheduling function resident in the MAC protocol layer.

A first advantage of this architecture is that the user based signal processing operations, such for example adaptive beamforming, can be performed in the $RU_{OFDM}$ for each user separately. This is possible, because the user signals are still separated in the frequency domain when they are exchanged with (i.e. transmitted to and/or received at) the remote units $RU_{OFDM}$. The user weighting operation is then performed in each remote unit $RU_{OFDM}$ and consists e.g. in the multiplication of the user data with a suitable set of complex weights, which may be different for each user.

In an embodiment, the remote units may thus perform a weighting operation at a block 150, before the signals are processed by the remaining blocks of the baseband modem shown in FIG. 3, e.g. an IFFT at a block 138 in order to bring the signals back to the time domain and a CP insertion at a block 140.

The resulting signal may then be filtered by a front-end 20, converted from digital to analog (D/A) by a block 22, up-converted from baseband to radiofrequency (RF) and amplified by a power amplifier at a block 24, and radiated by the $K_m$ antennas TX to the user terminals.

In an embodiment, the complex weights are calculated locally in each remote unit $RU_{OFDM}$ by means of any suitable method.

In an embodiment, the complex weights are calculated in the central unit $CU_{OFDM}$ and transmitted to the remote units $RU_{OFDM}$ in the form of control information. The calculation of the weighting coefficients in the central unit $CU_{OFDM}$ can also be performed jointly for different remote units RU e.g. in order to realize network coordination algorithms.

The following description refers to a possible embodiment, where such user weighting operations are performed in the block 150 of the remote units $RU_{OFDM}$.

The symbols of the $N_S$ resource grids RG can be stacked in a columns vector $\underline{x}^{(i)}$:

$$\underline{x}^{(i)}=[x_1^{(i)}, x_2^{(i)}, \ldots, x_{N_S}^{(i)}]^T \quad (1)$$

wherein $x_k^{(i)}$ denotes one modulated symbol of the i-th user mapped on a generic OFDMA subcarrier of the k-th resource grid RG (with $1 \le k \le N_S$).

In an embodiment, the $RU_{OFDM}$ applies a weighting matrix $\underline{W}^{(i)}$ to the modulation symbols of the i-th user, and thus the weighting matrix has size $K_M \times N_S$ and each element $w_{i,j}$ of the matrix is a suitable complex weight. For example, the complex weights may be calculated in order to perform different tasks, including adaptive beamforming.

The signal vector $\underline{y}^{(i)}=[y_1^{(i)}, x_2^{(i)}, \ldots, x_{K_M}^{(i)}]^T$ of the i-th user after weighting may thus be calculated to:

$$\underline{y}^{(i)}=W^{(i)}\underline{x}^{(i)} \quad (2)$$

In an embodiment, the weighting matrix $\underline{W}^{(i)}$ for a given user is not fixed but may vary both as a function of the considered OFDM subcarrier and also over different OFDM symbols. In general, the weighting matrix may change with both time (t) and frequency (f), e.g. in order to compensate the time variability and the frequency selectivity of the propagation channel.

Figure 6:
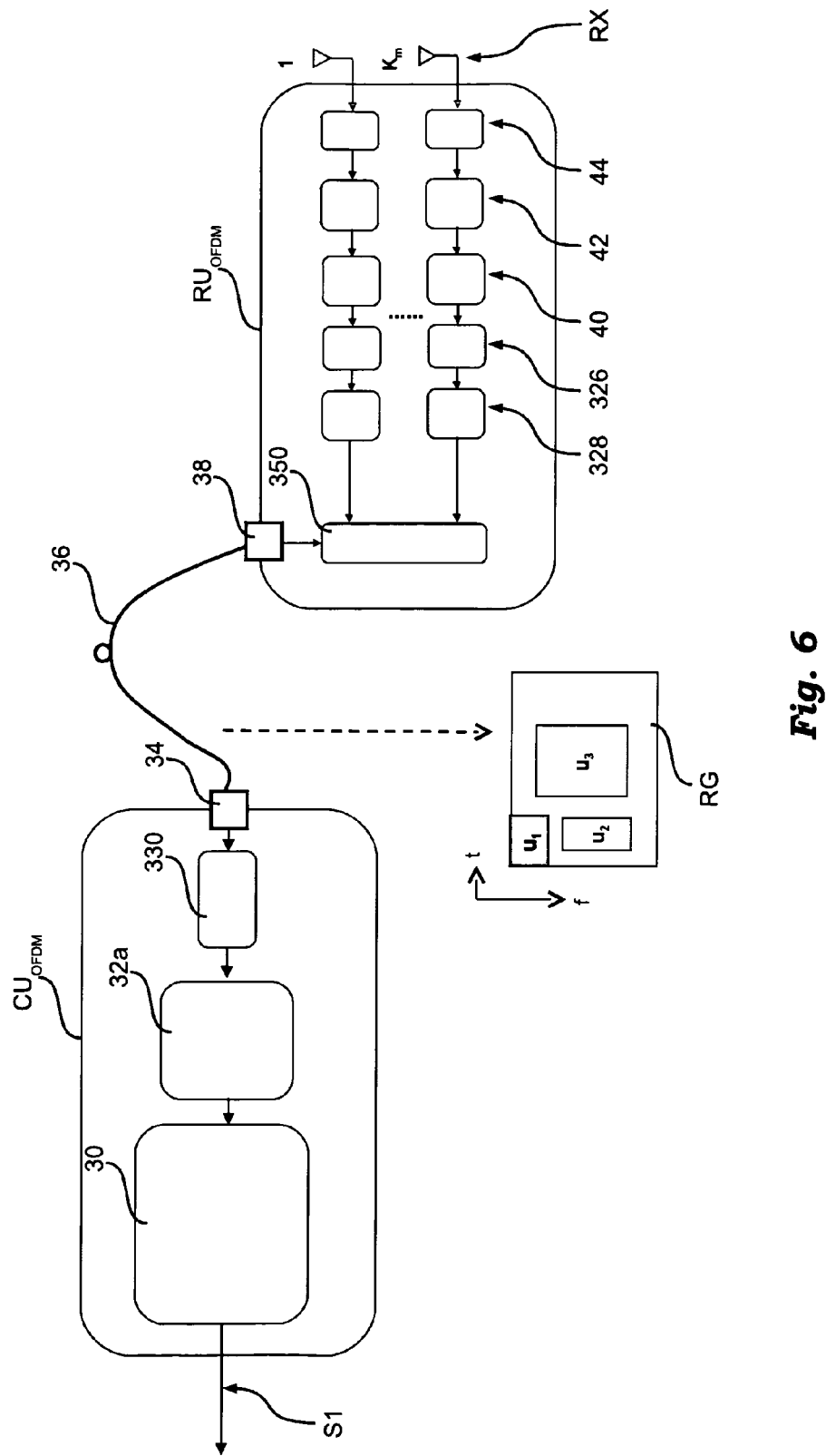
FIG. 6 is a block diagram of a first embodiment of the uplink portion of a DAS system supporting a radio access technology based on OFDM.

FIG. 6 shows an embodiment of a reception portion (namely the uplink) of an OFDM DAS system comprising a central unit $CU_{OFDM}$ and remote units $RU_{OFDM}$.

Basically the DAS architecture for the receiver part is complementary to the transmitter architecture.

In the embodiment illustrated, the remote units $RU_{OFDM}$ receive data at $K_m$ antennas RX from the user terminals. The received data are then down-converted from radiofrequency to baseband at blocks 44, and converted from analog to digital (A/D) at blocks 42 before the signals are filtered by front-ends 40.

In this embodiment, also the remote units $RU_{OFDM}$ may process the received signals for the distinct user.

In the embodiment illustrated, user weights are applied in each remote unit $RU_{OFDM}$ to the received data at a block 350. For this purpose, the $K_m$ received signals at baseband level are first subject to a CP removal operation at a block 326 and the signals are converted from the time domain to the frequency domain by means of an FFT operation at a block 328.

The weighted baseband signals in the time domain are then converted from electrical to optical at a block 38, before the signals are transmitted over the fiber link 36 to the central unit $CU_{OFDM}$.

In this embodiment, the operations of blocks 330 to 340 of the baseband modem shown in FIG. 3 are then performed in the central unit $CU_{OFDM}$. Specifically, the weighted baseband signals are first converted back from optical to electrical at a block 34, before the signals are processed by the resource demapping block 330 and a block 32a, which implements the operations of blocks 332 to 340, namely MIMO processing, demodulation, deinterleaving, H-ARQ processing and decoding.

The decoded data may then be passed to the block 30, which implements the higher layer protocols (L2/L3) and which is connected e.g. to a conventional S1 interface.

In an embodiment, the weighting operation for the uplink in block 350 is performed by applying weights to the received symbol vector $\underline{r}^{(i)}=[x_1^{(i)}, x_2^{(i)}, \ldots, x_{K_N}^{(i)}]^T$ of the i-th user for each OFDMA subcarrier of interest. In this case, the respective weighting matrix $\underline{Z}^{(i)}$ has size $N_S \times K_M$.

The user symbol vector after the weighting operation $\underline{q}^{(i)}=[q_1^{(i)}, q_2^{(i)}, \ldots, q_{N_S}^{(i)}]^T$ may be calculated to $$\underline{q}^{(i)} = \underline{Z}^{(i)} \underline{r}^{(i)} \tag{3}$$

In an embodiment, each calculated element $q_k^{(i)}$ is then written in the k-th resource grid in the position occupied by the respective subcarrier.

Again, the received data may be transmitted to the central unit $CU_{OFDM}$ over the fiber link 36 in the form of the $N_S$ resource grids RG, when those have been filled with the respective received data.

The central and remote units may implement both the transmission and the reception part and the fiber link 16 for transmission and the fiber link 36 for reception may be transmitted also on a common fiber. More to the point, any wired or even wireless communication link guaranteeing sufficient data throughput may be used instead of the fiber links 16 and 36.

Figure 1:
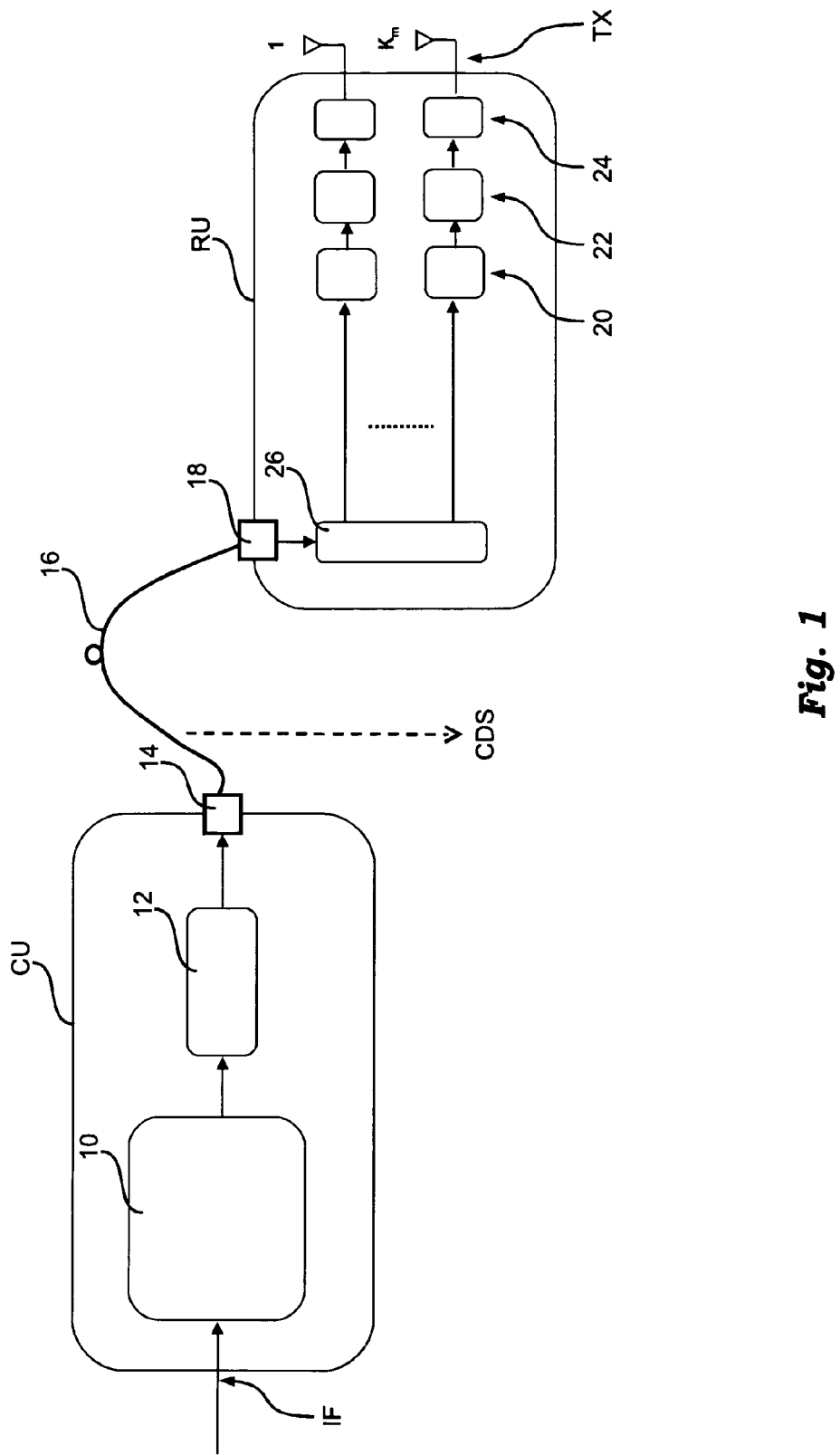
Figure 2:
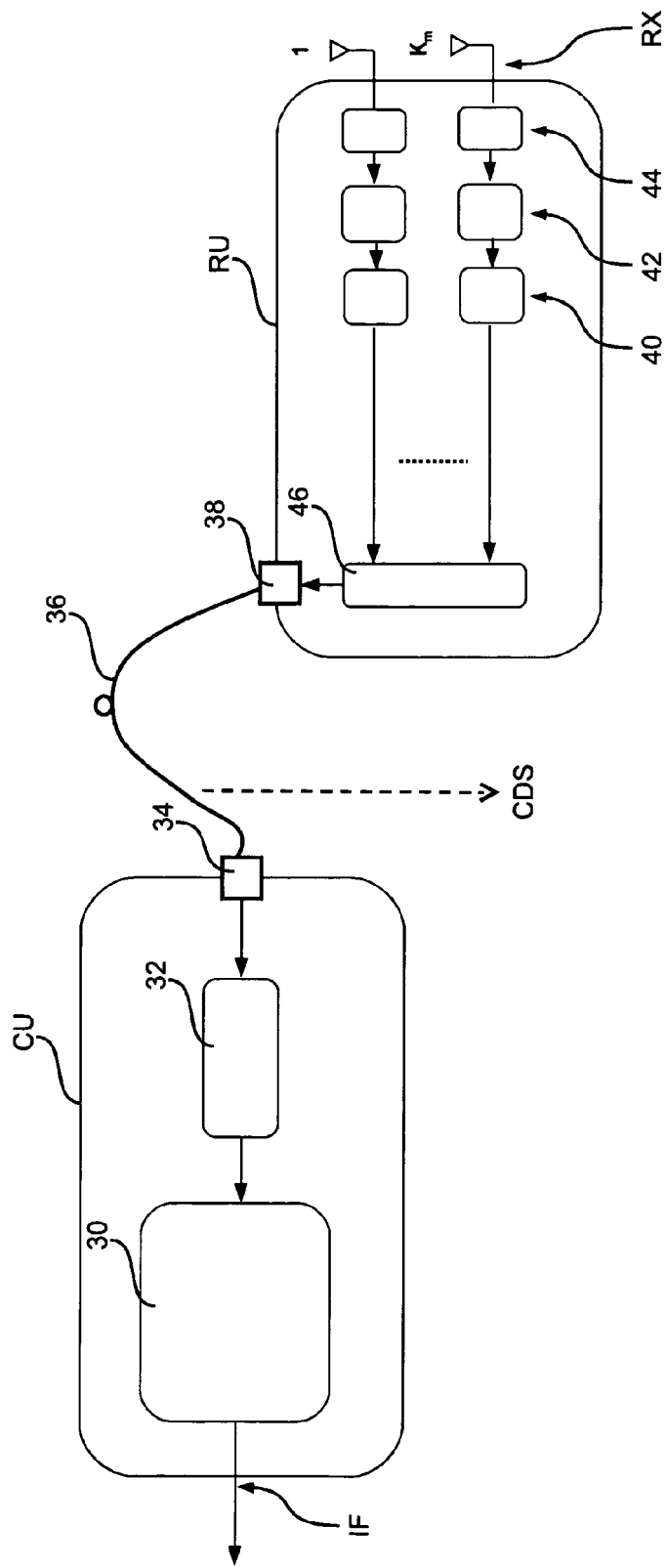

The embodiments described in the foregoing provide a reduction of the throughput over the fiber links 16 and 36 with respect to the prior-art DAS architecture shown in FIGS. 1 and 2. In the following, a conventional LTE communication system will be considered to show the throughput reduction. Anyhow, similar considerations may hold also for other communication systems based on the OFDMA access technique.

The transport requirements over the fiber link may be calculated in terms of throughput per Antenna Carrier (A×C). According to the CPRI specification, one antenna-carrier is the amount of digital baseband (I/Q) data necessary for either reception or transmission of only one carrier at one independent antenna element. The following parameters are defined for throughput estimation:

$F_s$ is the sampling frequency of the OFDMA signal in the time domain;

$N_{bit}$ is the number of quantization bits for each component (I or Q) of the OFDMA signal in time domain;

$N_{Sub}$ it the maximum number of used subcarriers in one OFDMA symbol;

MOD is the number of bits carried by the modulation scheme (e.g. MOD=6 for 64-QAM); and $T_{sym}$ is the OFDM symbol period, e.g. 66.7 μs (without the CP).

In case of the classical DAS architecture shown in FIG. 1 and compliant with the CPRI/OBSAI standards, the throughput on the fiber link 16 for the transmission of one time domain composite OFDM signal may be calculated with the following formula (without considering any transmission coding or signaling overhead)

$$T_{data,RU} = 2 \cdot F_s \cdot N_{bit} \tag{4}$$

where the factor 2 in the equation (4) is related to the transmission of the two (I/Q) signal components.

Conversely, in case of the DAS architecture disclosed herein with user based weighting, the throughput requirement over the fiber link for the transmission of the data of one resource grid may be calculated according to $$T_{data,RU} = \frac{N_{Sub} \cdot MOD}{T_{sym}} \tag{5}$$

The CPRI/OBSAI standard also foresee the possibility of protecting the information transmitted over the fiber by using specific codes that may introduce a moderate increase of the throughput with respect to the calculations of equations (4) and (5).

For example, assuming a 64-QAM modulation and 10 bits for each quantized OFDMA composite signal in the time domain (i.e. $N_{bit}$), the proposed architecture may require less than 20% of the throughput of the prior art arrangement shown with respect to FIG. 1.

The transmission of the OFDMA composite signal in the time domain is less efficient, e.g. due to the null subcarriers and the cyclic prefix that are transmitted on the fiber link even though they represent only redundant information.

The architecture shown in FIGS. 5 and 6 may not be compliant with the current version of the OBSAI or CPRI specifications, where the time domain baseband composite signal at the output of the BS equipment is taken as reference for the transmission over the fiber links.

A second embodiment takes the foregoing into account by providing the same level of flexibility in terms of user based processing at the remote units RU, but at the same time retaining compatibility with the OBSAI and CPRI standards. Compatibility with the OBSAI/CPRI standards is counterbalanced by the fact that the throughput over the fiber links remains substantially the same as in the prior-art DAS architecture shown in FIGS. 1 and 2.

Figure 7:
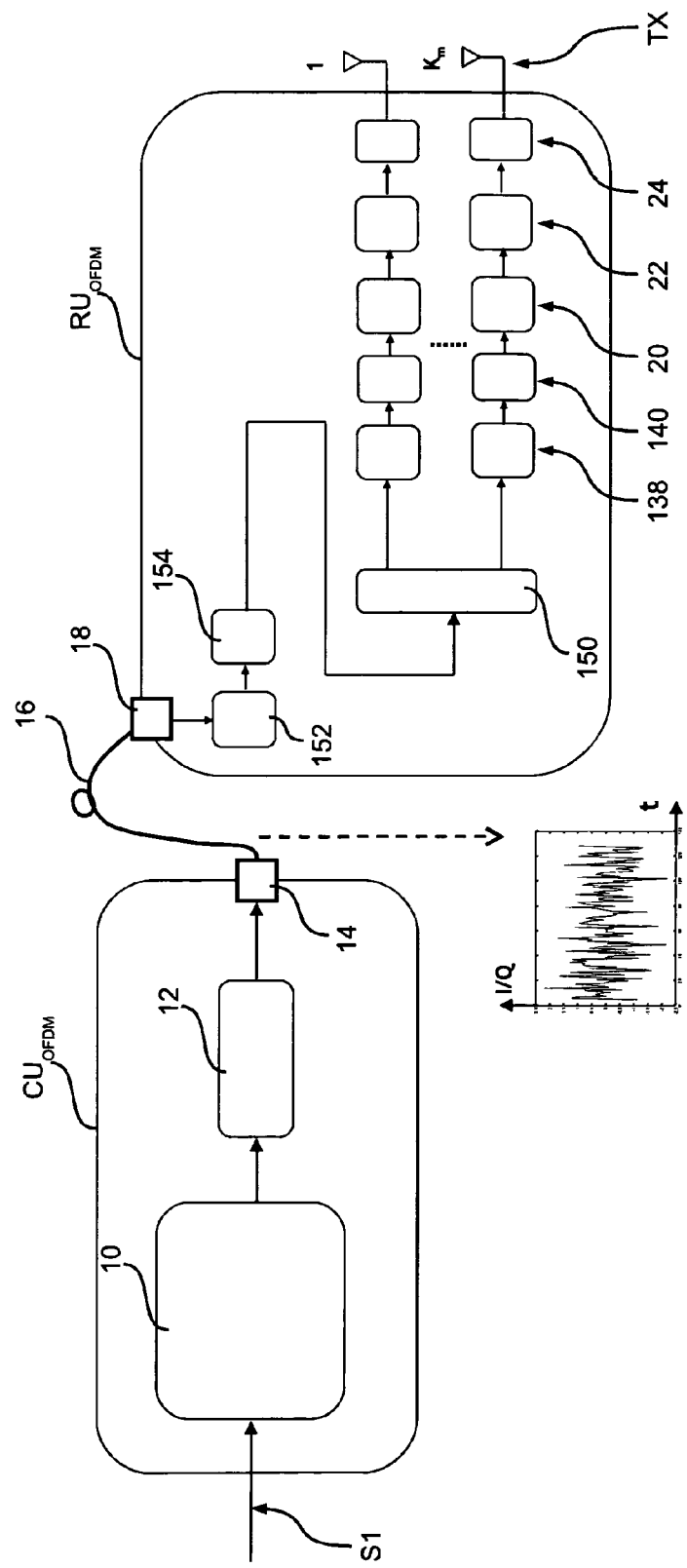
FIG. 7 is a block diagram of a second embodiment of the downlink portion of a DAS system supporting a radio access technology based on OFDM.

This embodiment is shown in FIG. 7 for the downlink transmission part. Substantially, this embodiment is based on the DAS architecture shown with respect to FIG. 1.

A central unit $CU_{OFDM}$ includes a block 10, which implements the higher layer protocols (L2/L3), and a block 12, which performs the physical layer (L1) signal processing operations up to the generation of the composite digital baseband signal CDS. The composite digital baseband signal is then converted from electrical to optical at a block 14 and transmitted over the fiber link 16 to the remote units $RU_{OFDM}$.

Each remote unit $RU_{OFDM}$ receives the composite baseband signal CDS that is first converted from optical to electrical at a block 18.

In this embodiment, the users are separated in the $RU_{OFDM}$ by performing some inverse processing at physical layer level. The inverse operations executed in the $RU_{OFDM}$ may include: CP removal at a block 152 and a FFT at a block 154 that brings the signal back to the frequency domain.

Subsequently the data may be processed as already described with respect to FIG. 5, i.e. the separated user signals may be subject to the weighting operations at a block 150 and then the signals are processed in order to bring them back to the time domain with an IFFT at a block 138 and to a CP insertion at a block 140.

The resulting signal may then be filtered by a front-end 20, converted from digital to analog (D/A) by a block 22, up-converted from baseband to radiofrequency (RF) and amplified by a power amplifier at a block 24, and radiated by the $K_m$ antennas TX.

Figure 8:
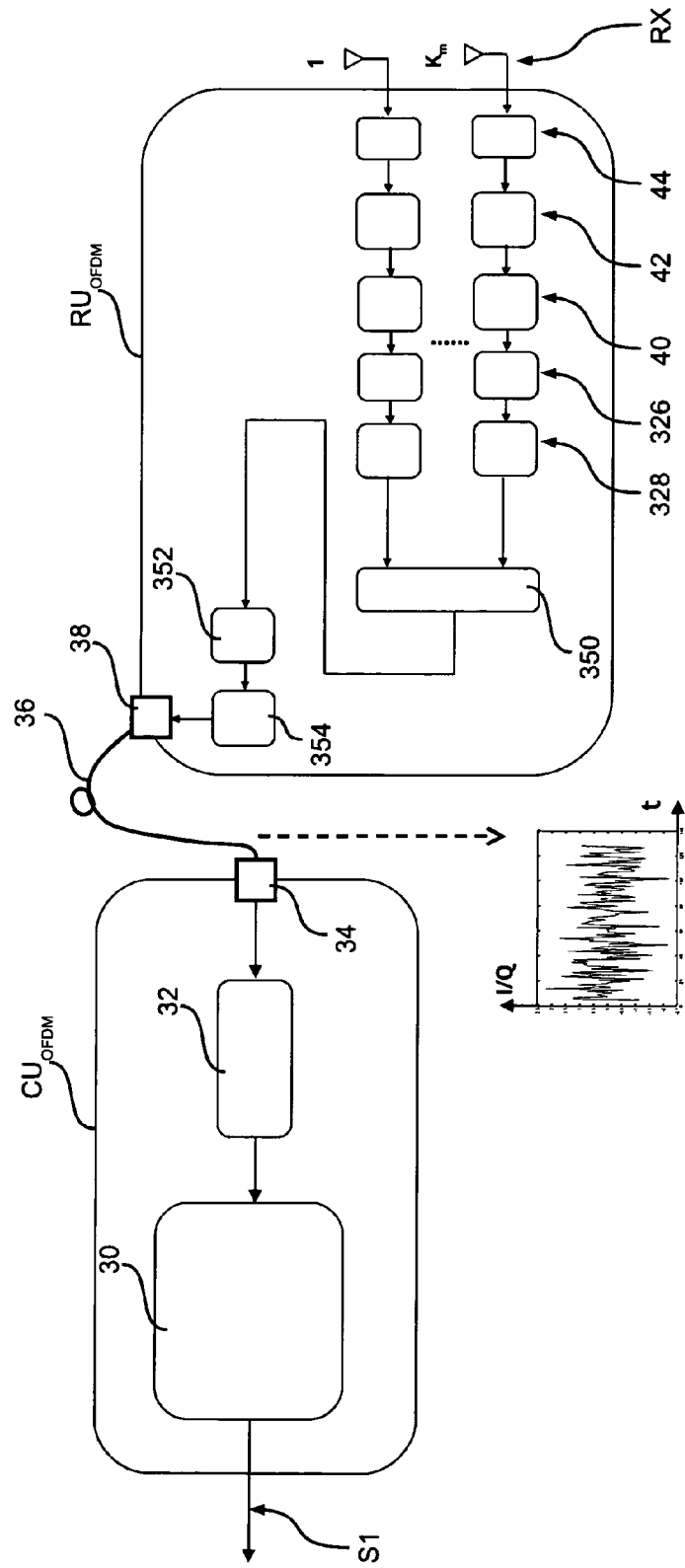
FIG. 8 is a block diagram of a second embodiment of the uplink portion of a DAS system supporting a radio access technology based on OFDM.

FIG. 8 shows the respective uplink part of a DAS architecture, which is compliant with OBSAI/CPRI. Also in this case the architecture is complementary to the transmit architecture shown with respect to FIG. 7.

In this embodiment, the remote units $RU_{OFDM}$ receive data at $K_m$ antennas RX. The received data are then down-converted from radiofrequency to baseband at blocks 44, and converted from analog to digital (A/D) at blocks 42 before the signals are filtered by front-ends 40.

Subsequently, a CP removal operation may be performed at a block 326, the signals may be converted from the time domain to the frequency domain at a block 328, and user weights may be applied at a block 350.

In order to provide compliance with OBSAI/CPRI, the signals are then processed to bring them back to the time domain with an IFFT at a block 352 and to a CP insertion at a block 354.

The weighted signals are then converted from electrical to optical at a block 38, before the signals are transmitted over the fiber link 36 to the central unit $CU_{OFDM}$, which may thus be compliant with OBSAI/CPRI and which had already been described in the foregoing e.g. with respect to FIG. 2.

As mentioned in the foregoing, the resource mapping may be defined through a mathematic relation or a dynamic look-up table that maps the modulations symbols to the inputs of the IFFT block. This resource mapping function may be provided by the central unit $CU_{OFDM}$ to the remote units $RU_{OFDM}$ in the form of control information. This information may also be refreshed on a frame by frame basis or e.g. with a refresh rate that corresponds to the scheduling period.

The embodiments described with respect to FIGS. 5 and 6 may be applied also to a MIMO system. In this case, the $N_S$ resource grids at the output of the resource mapping blocks may be transmitted over the fiber links. For example, in an embodiment, a multiplexing e.g. TDMA is used to transmit these streams over the fiber.

Similarly, also the architectures compliant with the OBSAI/CPRI standard, described with respect to FIGS. 7 and 8, may be used in the MIMO case by transmitting the $N_S$ composite baseband signals over the fiber.

The architectures described with respect to FIGS. 5 to 8 may be applied also to other communication systems, such as wireless communication systems based on the CDMA access technique including Wideband CDMA (WCDMA) and High Speed Packet Access (HSPA).

Figure 9:
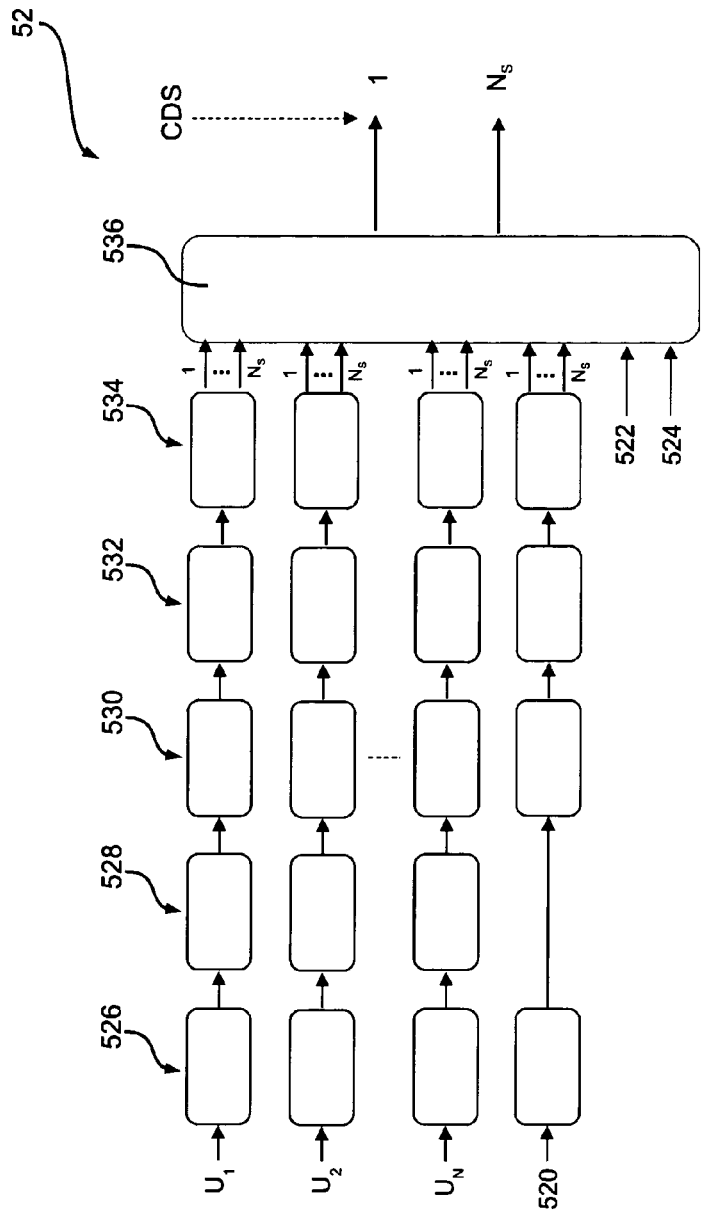
FIG. 9 is a block diagram of a typical downlink baseband modem supporting a radio access technology based on CDMA.

FIG. 9 shows in that respect an exemplary block diagram of a CDMA baseband modem 52 for the downlink transmission part, which has a substantially similar architecture as the OFDM baseband modem already described with respect to FIG. 3.

The baseband modem 52 receives at the input the transport blocks TB from the Medium Access Control (MAC) layer for a set of different users and provides at the output a composite digital baseband signal CDS formed by the sum of the different user data channels $U_1, U_2, \ldots U_N$ and by control channels 520, pilot channel 522 and synchronization channel 524.

The user data channels $U_1, U_2, \ldots U_N$ are processed by channel coding blocks 526. In case of e.g. HSPA, the encoded bits of the user data channels $U_1, U_2, \ldots U_N$ may then be provided to a Hybrid Automatic Repeat-reQuest (H-ARQ) block 528 that manages the retransmission at physical layer level. The user bit streams may then be subjected to interleaving at a block 530, modulation at a block 532 and possibly to MIMO processing at a block 534. In case of a multi-antenna transmission system that adopts MIMO techniques, the modulated symbols are elaborated by block 534 that provides at the output $N_S \geq 1$ data streams. The complex symbols may then be combined at a block 536.

The block 536 receives at the input also the control channels 520 that may carry signaling information for all the users in the cell. Such control channels may carry critical information and thus are typically transmitted using robust channel coding schemes. H-ARQ procedures are not used for the control channels, while the other operations at blocks 526 to 534 are performed.

The combination of the various channels in block 536 may be performed by applying different spreading codes to the various channels, providing thus at the output the composite digital baseband signal CDS at chip level for the $N_S$ MIMO streams.

The CDMA baseband modem at the receiver is composed by the cascade of the functional blocks that perform substantially the inverse processing of the operations performed by the transmitter.

In an embodiment, the despreading operation at the receiver is realized by a Rake receiver that despreads and recombines coherently the different signal replicas. The various signal replicas may then be recombined at symbol level using for example the MRC (Maximum Ratio Combining) technique.

Figure 10:
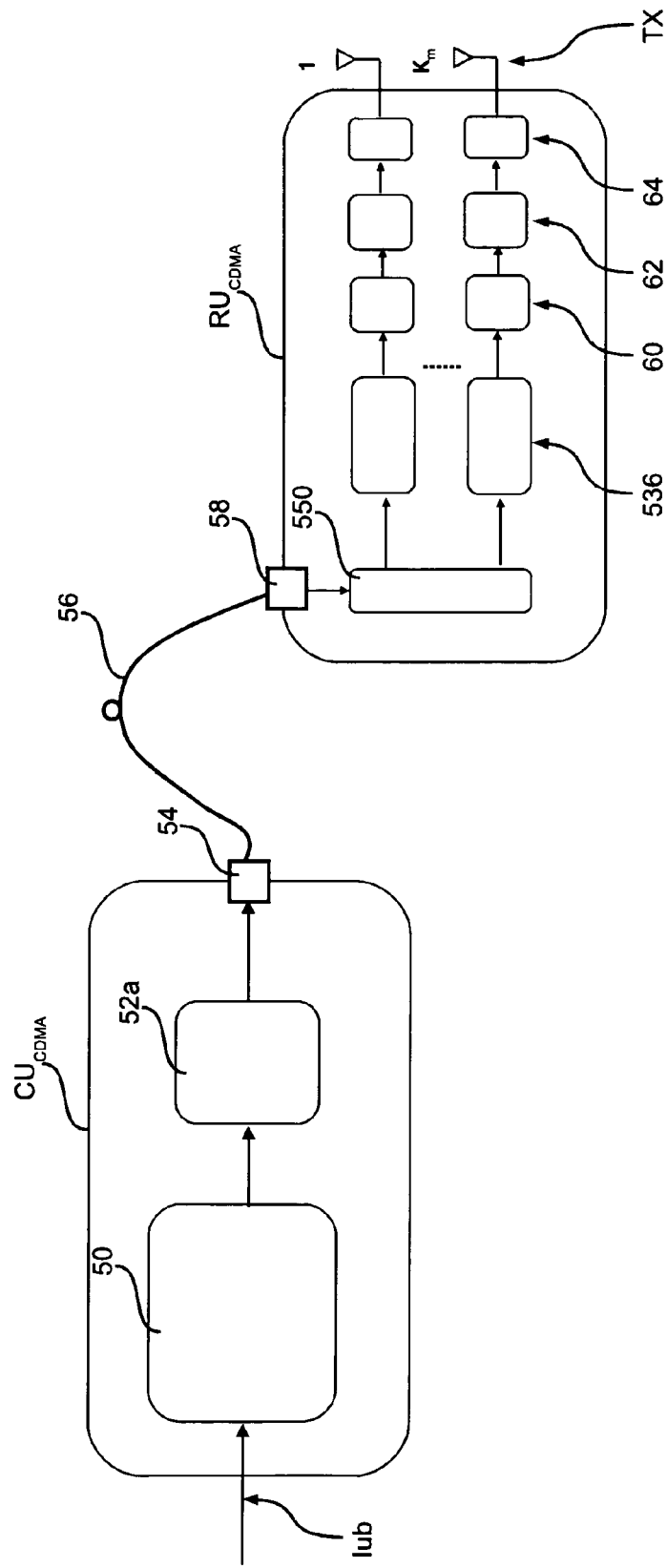
FIG. 10 is a block diagram of an exemplary embodiment of the downlink portion of a DAS system supporting a radio access technology based on CDMA.
Figure 11:
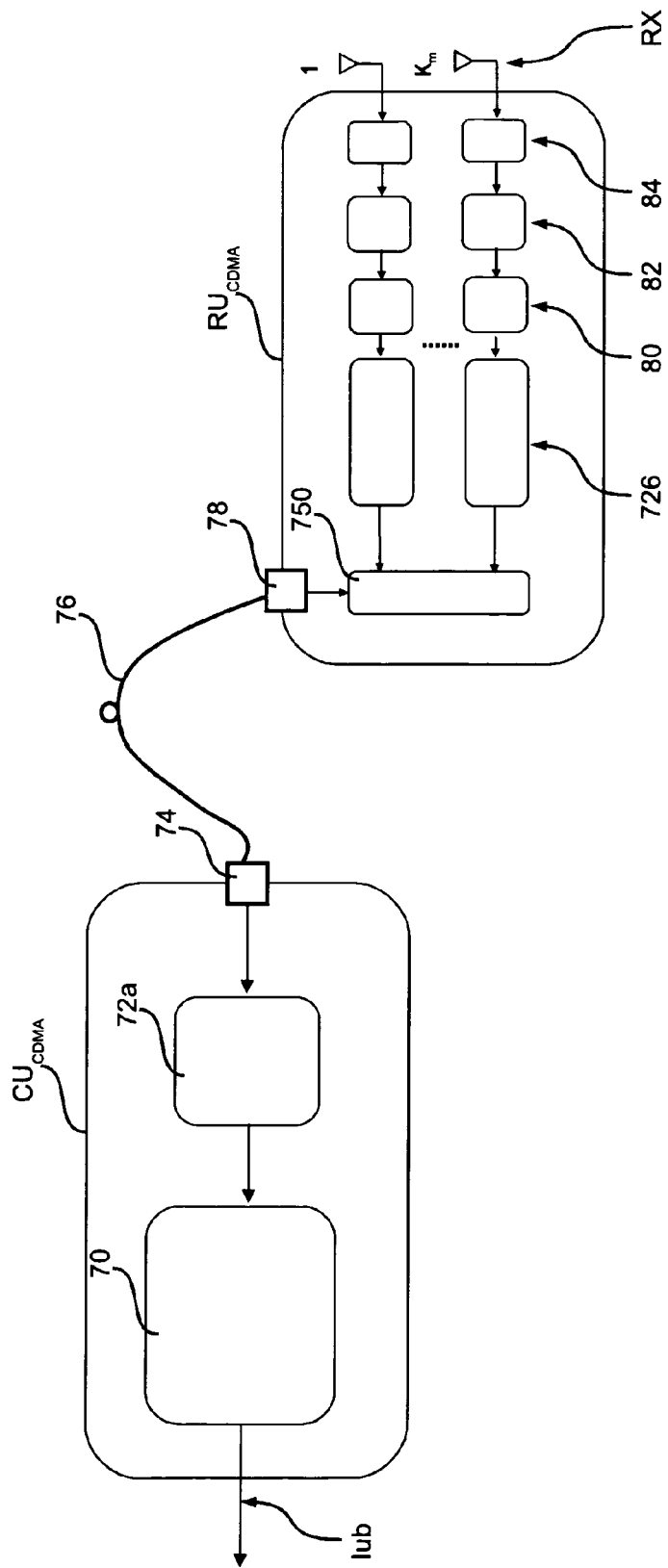
FIG. 11 is a block diagram of an exemplary embodiment of the uplink portion of a DAS system supporting a radio access technology based on CDMA.

A possible embodiment of a DAS architecture for a CDMA based system with signal processing on user base is shown in FIGS. 10 and 11 for the downlink transmitter and the uplink receiver part, respectively.

In the embodiment shown, such a DAS system comprises a central unit $CU_{CDMA}$ and remote units $RU_{CDMA}$, and operates in substantially similar manner as the OFDM DAS system already described in the foregoing with respect to FIGS. 5 and 6. The main difference for the transmission part of the CDMA systems is that a spreading operation is performed in the remote units $RU_{CDMA}$, while an IFFT has been performed in the remote units $RU_{OFDM}$.

Specifically, the central unit $CU_{CDMA}$ is connected to a Radio Network Controller (RNC) by means of the Iub interface, and may implement in a block 50 higher protocol layers, such as the MAC-HS protocol in case of a HSPA system.

In the exemplary embodiment shown, the central unit $CU_{CDMA}$ implements in a block 52a only part of the baseband functionalities, including e.g. channel coding, H-ARQ, interleaving, modulation and MIMO processing. In this case, the signal transmitted to the remote units $RU_{CDMA}$ may be represented by the modulated symbol streams of the different physical channels. Specifically, the modulated symbol streams may first be converted from electrical to optical at a block 54 and transmitted over a fiber link 56 to the remote units $RU_{CDMA}$.

In an embodiment, the physical channels are multiplexed on the fiber by using some multiple access protocol such for example time division multiple access (TDMA).

Each remote unit $RU_{CDMA}$ receives the modulated symbol streams that are first converted from optical to electrical at a block 58. The symbols are then subject to the user weighting in the remote units $RU_{CDMA}$ at a block 550 and are processed by a block 536 that performs the spreading operation.

The resulting signal may then be filtered by a front-end 60, converted from digital to analog at a block 62, up-converted from baseband to radiofrequency and amplified by a power amplifier at a block 64, and radiated by $K_m$ antennas TX.

FIG. 11 shows a respective portion of the reception part (namely the uplink) of the CDMA DAS system.

Basically the DAS architecture for the receiver part is complementary to the transmitter architecture.

In the embodiment shown, the remote units $RU_{CDMA}$ receive data at $K_m$ antennas RX. The received data are then down-converted from radiofrequency to baseband at blocks 84, and converted from analog to digital at blocks 82, before the signals are filtered by front-ends 80.

Subsequently, the distinct user signal may be processed in the remote units $RU_{CDMA}$. For example, user weights may be applied in each remote unit $RU_{CDMA}$ to the received data at a block 750. For that purpose, the $K_m$ received signals at baseband level are first subject to a despreading operation at a block 726. The despreading operation can be performed for example by means of a Rake receiver. The despreading operations permit the separation of the different user channels which are then subject to the weighting operation. The $K_m$ received signals after despreading related to a specific user channel are then weighted, as shown e.g. by equation (3), and summed at the block 750.

The scope and the benefits of this disclosure are retained if the despreading operation at block 726 in the remote unit $RU_{CDMA}$ is preceded by an equalizer or if the receiver of the remote units $RU_{CDMA}$ is equipped with interference cancellation techniques such as Serial/Parallel Interference Cancellation (SIC/PIC).

The weighted signals are then converted from electrical to optical at a block 78, before the signals are exchanged with (i.e. transmitted to or received at) the central units $CU_{CDMA}$ via a fiber link 76. Also in this case the different user channels may be multiplexed on the fiber by using some multiple access protocol such for example TDMA.

The weighted baseband signals may then converted back from optical to electrical at a block 74 before the signals are processed by a block 72a, which implements the remaining operations at physical layer, such as MIMO processing, demodulation, deinterleaving, H-ARQ processing and decoding.

The decoded data may then be passed to a block 70 which implements higher layer protocols, such as the MAC-E protocol in case of a HSPA system, and which may be connected to the RNC, e.g. via a conventional Iub interface.

In an embodiment, a CDMA DAS system is provided that retains compatibility with the OBSAI and CPRI standards.

Such an embodiment may be realized by using a central unit $CU_{CDMA}$, which implements both the higher layer protocols and the physical layer (L1) signal processing operations, and the data between the central unit $CU_{CDMA}$ and the remote units $RU_{CDMA}$ are exchanged in the form of the composite digital baseband signal CDS.

For the downlink, each remote unit $RU_{CDMA}$ may then separate the user signals again by performing some inverse processing at physical layer level, such as a despreading operation, in order to apply subsequently the user weights at the block 550.

Similarly, each remote unit $RU_{CDMA}$ may recombine the user signals after the weighting operation for the uplink. This may be achieved e.g. by performing a spreading operation on the weighted user signals.

Without prejudice to the underlying principles of the invention, the details and the embodiments may vary, even appreciably, with respect to what has been described by way of example only, without departing from the scope of the invention as defined by the annexed claims.

The invention claimed is:

1. A method of arranging exchange of signals between user terminals in a cellular communication system and at least one base station comprising a central unit and a plurality of remote units, comprising:

performing a first baseband processing at said central unit, the first baseband processing including mapping signals for different user terminals in the time and frequency domains according to a mapping function resident in said central unit, the result of said mapping being organized in $N_s$ resource grids filled with modulation symbols of different data and control channels according to said mapping function, where $N_s$ is the number of resource grids at an output of the central unit;

exchanging the mapping function and the result of said mapping between said central unit and said remote units as an aggregated signal for plural user terminals in the frequency domain; and performing a second baseband processing at said remote units based on the result of said mapping received from the central unit, the second baseband processing including performing a weight calculation while still in the frequency domain, applying said calculated weights to distinct signals each associated with a respective one of said plural user terminals based on said mapping function to perform adaptive beamforming on a per-user basis, and mapping the modulation symbols to inputs of an inverse Fast Fourier transform block within said remote units, said calculated weights being complex weights that are varied with respect to time and frequency and different for each user terminal.

2. The method of claim 1, wherein said signals are orthogonal frequency division multiple access signals.

3. The method of claim 1, wherein said aggregated signal for plural user terminals being exchanged between said central unit and said remote units are respective orthogonal frequency division multiple access signals in the frequency domain.

4. The method of claim 1, wherein said signals are code division multiple access signals.

5. The method of claim 4, comprising performing at said remote units at least one of:

a spreading operation on processed code division multiple access signals to be sent to said plural user terminals for converting said processed code division multiple access signals from symbol to chip level before said signals are processed at said remote units as distinct signals each associated with a respective one of said plural users; and a despreading operation on the code division multiple access signals received from said plural user terminals for converting said received code division multiple access signals from chip to symbol level.

6. The method of claim 4, wherein said aggregated signal for plural users being exchanged between said central unit and said remote units are respective code division multiple access signals at symbol level.

7. The method of claim 4, wherein said aggregated signal for plural user terminals being transmitted from said central unit to said remote units are the respective code division multiple access signals at chip level, and wherein the method comprises performing at said remote units at least one despreading operation for converting said code division multiple access signals received from said central units from chip to symbol level before said signals are processed at said remote units as distinct signals each associated with a respective one of said plural user terminals.

8. A distributed antenna system for exchanging signals with user terminals in a cellular communication system, comprising a central unit and a plurality of remote units, wherein said distributed antenna system is configured for performing a method, comprising:

performing a first baseband processing at said central unit, the first baseband processing including mapping signals for different user terminals in the time and frequency domains according to a mapping function resident in said central unit, the result of said mapping being organized in $N_s$ resource grids filled with modulation symbols of different data and control channels according to said mapping function, where $N_s$ is the number of resource grids at an output of the central unit;

exchanging the mapping function and the result of said mapping between said central unit and said remote units as an aggregated signal for plural user terminals in the frequency domain; and performing a second baseband processing at said remote units based on the result of said mapping received from the central unit, the second baseband processing including performing a weight calculation while still in the frequency domain, applying said calculated weights to distinct signals each associated with a respective one of said plural user terminals based on said mapping function to perform adaptive beamforming on a per-user basis, and mapping the modulation symbols to inputs of an inverse Fast Fourier transform block within said remote units, said calculated weights being complex weights that are varied with respect to time and frequency and different for each user terminal.

9. A non-transitory computer-readable medium storing a computer program product, loadable in a memory of at least one computer and comprising software code portions that when executed on a computer perform a method, comprising:

performing a first baseband processing at said central unit, the first baseband processing including mapping signals for different user terminals in the time and frequency domains according to a mapping function resident in said central unit, the result of said mapping being organized in $N_s$ resource grids filled with modulation symbols of different data and control channels according to said mapping function, where $N_s$ is the number of resource grids at an output of the central unit:

exchanging the mapping function and the result of said mapping between said central unit and said remote units as an aggregated signal for plural user terminals in the frequency domain; and performing a second baseband processing at said remote units based on the result of said mapping received from the central unit, the second baseband processing including performing a weight calculation while still in the frequency domain, applying said calculated weights to distinct signals each associated with a respective one of said plural user terminals based on said mapping function to perform adaptive beamforminq on a per-user basis, and mapping the modulation symbols to inputs of an inverse Fast Fourier transform block within said remote units, said calculated weights being complex weights that are varied with respect to time and frequency and different for each user terminal.

* * * * *